United States Patent
Raetzman et al.

(10) Patent No.: US 9,730,378 B2
(45) Date of Patent: Aug. 15, 2017

(54) ADJUSTABLE WIDTH ROW UNIT FOR PLANTER TRANSPORT

(71) Applicant: CNH Industrial America LLC, New Holland, PA (US)

(72) Inventors: Ryan R. Raetzman, Lemont, IL (US); Brian J. Anderson, Yorkville, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 121 days.

(21) Appl. No.: 14/755,890

(22) Filed: Jun. 30, 2015

(65) Prior Publication Data

US 2017/0000015 A1    Jan. 5, 2017

(51) Int. Cl.
*A01C 5/06* (2006.01)
*A01C 7/20* (2006.01)
*A01B 73/00* (2006.01)
*A01B 73/06* (2006.01)

(52) U.S. Cl.
CPC .............. *A01C 5/068* (2013.01); *A01B 73/00* (2013.01); *A01C 5/064* (2013.01); *A01C 5/066* (2013.01); *A01C 7/203* (2013.01); *A01B 73/065* (2013.01)

(58) Field of Classification Search
CPC combination set(s) only.
See application file for complete search history.

(56) References Cited

U.S. PATENT DOCUMENTS

| 1,106,879 | A | * | 8/1914 | Leischner | A01C 5/06 111/194 |
| 2,694,356 | A | * | 11/1954 | Haas | A01C 5/06 111/136 |
| 4,425,857 | A | * | 1/1984 | Lienemann | A01C 5/06 111/134 |
| 4,700,641 | A | | 10/1987 | Head, Jr. et al. | |
| 4,831,945 | A | | 5/1989 | Neumeyer | |

(Continued)

FOREIGN PATENT DOCUMENTS

| AU | 2003268595 A1 | 7/2004 |
| WO | 2010/091469 A2 | 8/2010 |

(Continued)

*Primary Examiner* — Alicia Torres
(74) *Attorney, Agent, or Firm* — Rebecca L. Henkel; Rickard K. DeMille (57) ABSTRACT

An agricultural planting apparatus includes a chassis and a row unit carried by the chassis that defines a width. The row unit includes a unit body carried by the chassis; a metering device carried by the unit body; at least one furrowing disc carried by the unit body; at least one closing disc carried by the unit body behind the furrowing disc(s); a restraining member carried by the mounting body; and a pressing wheel carried by the unit body, pivotally movable about an axis of rotation relative to the unit body, positionable behind the closing disc(s), and reversibly connectable to the restraining member. The pressing wheel has a constrained pivoting configuration when connected to the restraining member that resists pivoting and a freely pivoting configuration when disconnected from the restraining member to reduce the width of the row unit when pivoted in an upward direction about the axis of rotation.

12 Claims, 4 Drawing Sheets

(56) References Cited

U.S. PATENT DOCUMENTS

| | | | |
|---|---|---|---|
| 4,846,084 A * | 7/1989 | Sigle | A01C 5/06 111/136 |
| 5,081,942 A | 1/1992 | Clark et al. | |
| 5,394,946 A | 3/1995 | Clifton et al. | |
| 5,595,130 A | 1/1997 | Baugher et al. | |
| 5,724,903 A | 3/1998 | Yoder et al. | |
| 5,809,915 A | 9/1998 | Jess et al. | |
| 5,826,524 A | 10/1998 | Yoder | |
| 6,012,534 A * | 1/2000 | Kovach | A01B 13/08 172/156 |
| 6,112,827 A | 9/2000 | Reiber et al. | |
| 6,131,669 A | 10/2000 | Friggstad et al. | |
| 6,167,972 B1 | 1/2001 | Hundeby et al. | |
| 6,192,994 B1 | 2/2001 | Friggstad et al. | |
| 6,202,756 B1 | 3/2001 | Hundeby et al. | |
| 6,293,352 B1 | 9/2001 | Hundeby et al. | |
| 6,305,478 B1 | 10/2001 | Friggstad | |
| 6,502,644 B2 | 1/2003 | Steinlage et al. | |
| 7,159,523 B2 | 1/2007 | Bourgault et al. | |
| 7,261,048 B1 | 8/2007 | Hantke | |
| 7,377,221 B1 | 5/2008 | Brockmeier | |
| 7,438,006 B2 | 10/2008 | Mariman et al. | |
| 7,617,784 B2 | 11/2009 | Friggstad | |
| 7,946,231 B2 | 5/2011 | Martin et al. | |
| 7,997,217 B2 | 8/2011 | Stark et al. | |
| 8,336,468 B2 | 12/2012 | Lung | |
| 8,356,563 B2 | 1/2013 | Schaffert et al. | |
| 8,469,114 B1 | 6/2013 | Borkgren | |
| 8,635,962 B2 * | 1/2014 | Schilling | A01C 7/203 111/134 |
| 8,700,269 B2 | 4/2014 | Hubalek | |
| 2010/0059238 A1 * | 3/2010 | Kovach | A01C 7/203 172/1 |
| 2013/0206431 A1 | 8/2013 | Freed | |
| 2013/0284467 A1 | 10/2013 | Snider et al. | |
| 2013/0284468 A1 | 10/2013 | Barnett et al. | |
| 2013/0284469 A1 | 10/2013 | Barnett et al. | |
| 2014/0053522 A1 | 2/2014 | Kolegaev et al. | |
| 2014/0190711 A1 | 7/2014 | Horsch | |
| 2014/0224513 A1 | 8/2014 | Van Buskirk et al. | |
| 2014/0262368 A1 | 9/2014 | Landoll et al. | |
| 2014/0262379 A1 | 9/2014 | Landoll et al. | |

FOREIGN PATENT DOCUMENTS

| | | |
|---|---|---|
| WO | 2011/135272 A1 | 11/2011 |
| WO | 2012/173595 A1 | 12/2012 |
| WO | 2013/110184 A1 | 8/2013 |

* cited by examiner

ADJUSTABLE WIDTH ROW UNIT FOR PLANTER TRANSPORT

BACKGROUND OF THE INVENTION

1. Field of the Invention

The present invention relates to agricultural planters, and, more particularly, to agricultural planter row units.

2. Description of the Related Art

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, which may include an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, a pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

One issue that arises with the increasing size of agricultural planters is transporting such large assemblies. The width of the planter is especially problematic during transport. Due to their large width, many planters cannot be transported in their normal operation configuration.

Before transporting a planter, it is typically folded into a configuration that reduces its overall dimensions. In the folded configuration, the widest points of the planter can be on the rear ends of the pressing wheels, which will define the width of the planter when in the road transport mode. One known solution to reduce the width of a planter during transport is to remove the pressing wheels from the row units before transport, fold the planter, and then re-attach the pressing wheels once the planter has reached its desired destination. This is not only a time consuming process that requires one or more tools to perform, but also raises the risk that one or more of the pressing wheels is not transported with the planter. Without a pressing wheel, the seeds planted by the row unit may not have good soil contact, which can increase the amount of time it takes for the seed to grow or prevent the seed from growing at all.

What is needed in the art is a way to reduce the width of an agricultural planter during transport while overcoming some of the disadvantages of known devices.

SUMMARY OF THE INVENTION

The present invention provides an agricultural planter with a row unit having a pressing wheel that can be pivoted vertically to reduce a width of the agricultural planter during transport.

The invention in one form is directed to an agricultural planting apparatus including a chassis and a row unit carried by the chassis that defines a width. The row unit includes a unit body carried by the chassis; a metering device carried by the unit body; at least one furrowing disc carried by the unit body; at least one closing disc carried by the unit body and positioned behind the at least one furrowing disc in a direction of travel; a restraining member carried by the mounting body; and a pressing wheel carried by the unit body, pivotally movable about an axis of rotation relative to the unit body, positionable behind the at least one closing disc in the direction of travel, and reversibly connectable to the restraining member. The pressing wheel has a constrained pivoting configuration when connected to the restraining member and a freely pivoting configuration when disconnected from the restraining member. The pressing wheel resists pivoting in the restrained pivoting configuration and is configured to reduce the width of the row unit when pivoted in an upward direction about the axis of rotation in the freely pivoting configuration.

The invention in another form is directed to a packing assembly for a row unit of a planting apparatus that defines a width and includes a mounting body including a pivot feature defining an axis of rotation; at least one closing disc connected to the mounting body; a restraining member connected to the mounting body; and a pressing wheel pivotally connected to the pivot feature that is reversibly connectable to the restraining member. The pressing wheel has a constrained pivoting configuration when connected to the restraining member and a freely pivoting configuration when disconnected from the restraining member. The pressing wheel resists pivoting in the restrained pivoting configuration and is configured to reduce the width of the row unit when pivoted in an upward direction about the axis of rotation in the freely pivoting configuration.

An advantage of the present invention is that the width of the agricultural planter can be reduced without the need for using tools.

Another advantage is that the pressing wheel remains connected to the row unit so there is a reduced risk of the pressing wheel being lost or forgotten during transport.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
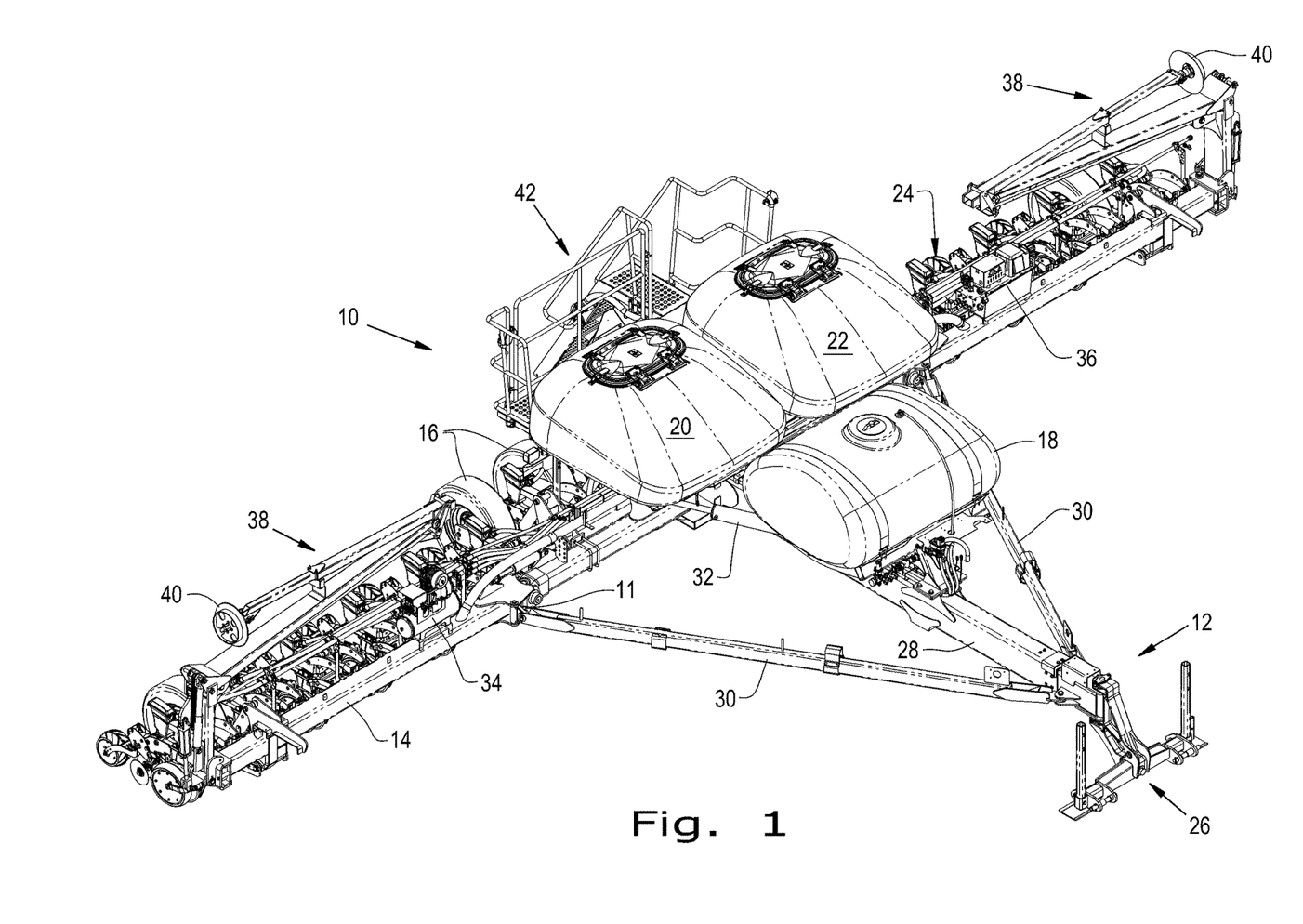
FIG. 1 is a perspective view of an embodiment of an agricultural planter according to the present invention.

Referring now to the drawings, and more particularly to FIG. 1, there is shown an embodiment of an agricultural planter 10 according to the present invention which generally includes a chassis 11 forming a support structure for components of the planter 10. The planter 10 can include a hitch assembly 12 at a front of the planter 10 connected to a tool bar 14 to form the chassis 11, main wheels 16 carried by the chassis 11 near a rear of the planter 10, one or more storage tanks 18, 20, 22 carried by the chassis 11 that can be filled with seed or other agriculture material, and a plurality of row units 24 connected to the tool bar 14 and arranged laterally across a length of the tool bar 14 so that they are carried by the chassis. The hitch assembly 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen throughout FIG. 1, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow an operator to access the storage tanks 20 and 22.

Figure 2:
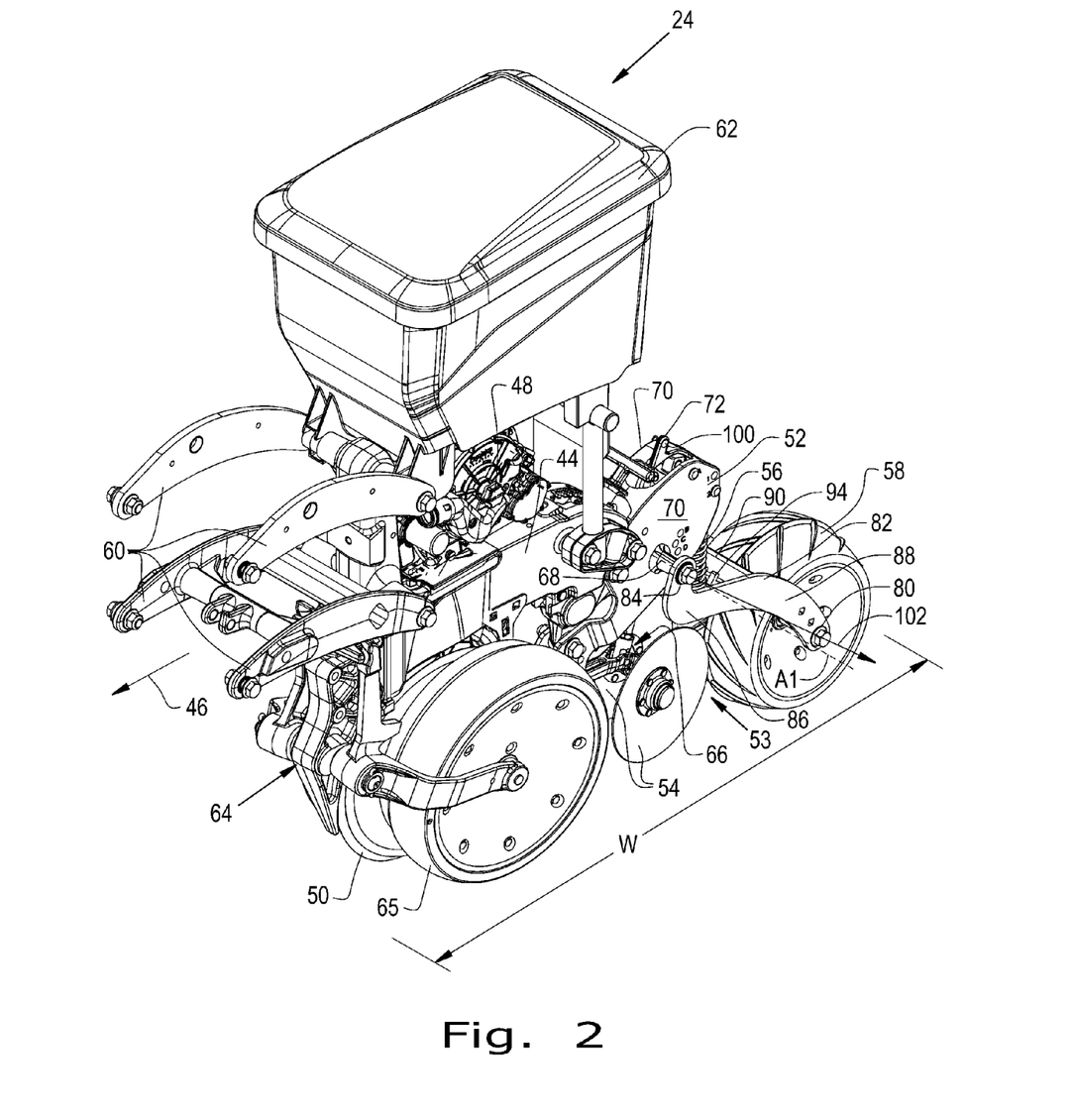
FIG. 2 is a perspective view of an embodiment of a row unit according to the present invention with a pressing wheel in a restrained pivoting configuration and a first orientation.
Figure 3:
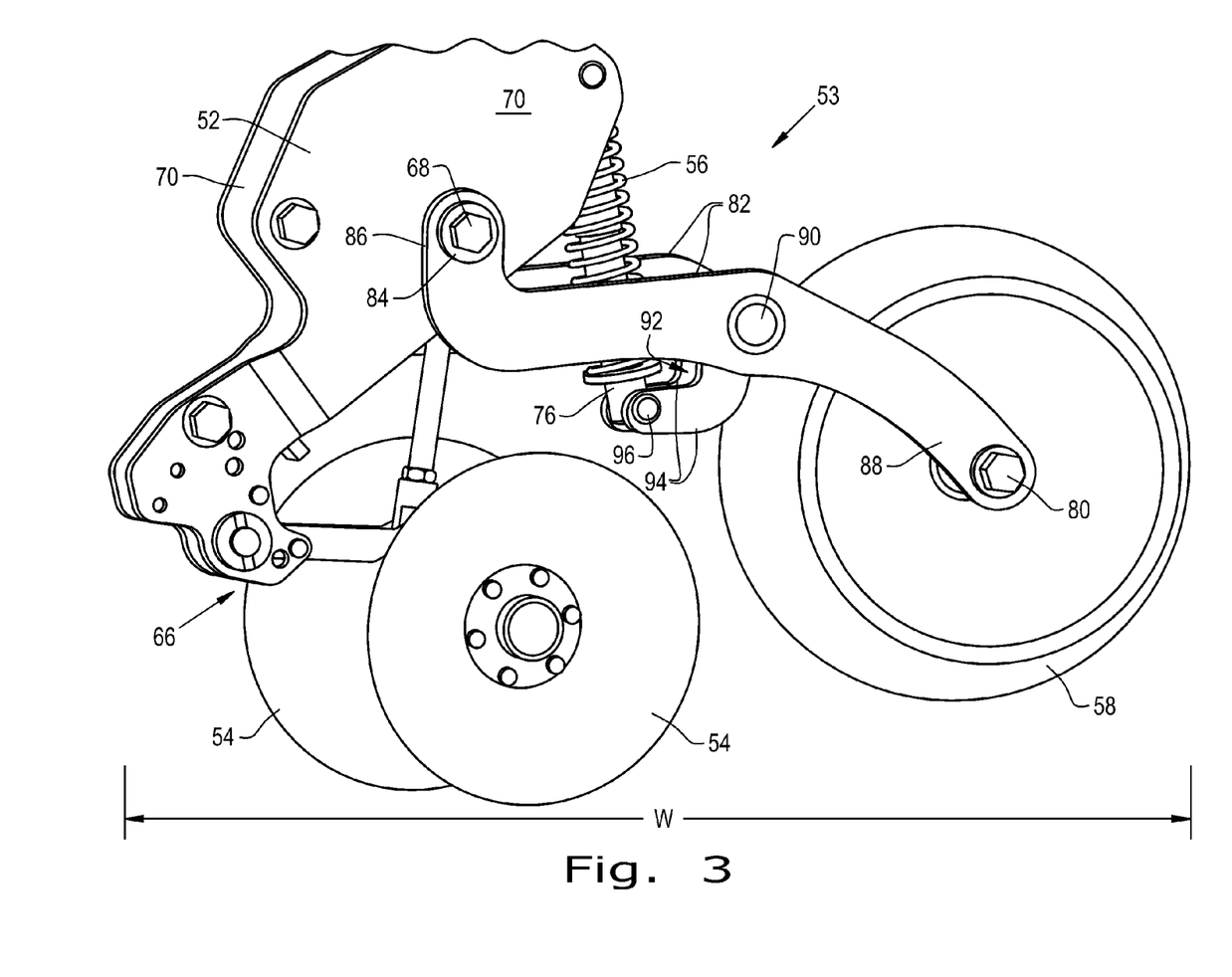
FIG. 3 is a perspective view of a packing assembly shown in FIG. 2.

Referring now to FIGS. 2 and 3, an embodiment of an individual row unit 24 is shown that is not connected to the tool bar 14. As can be seen, the row unit 24 generally includes a unit body 44 that can be carried by the chassis 11 in a direction of travel, signified by arrow 46, a metering device 48 carried by the unit body 44, a furrowing disc 50 connected to the unit body 44, a mounting body 52 connected to the unit body 44, closing discs 54 carried by the unit body 44, a restraining member 56 connected to the mounting body 52, and a pressing wheel 58 pivotally movable relative to and carried by the unit body 44 via connection to the mounting body 52 and is positionable behind the furrowing disc 50. As can be seen, the unit body 44 can have toolbar connecting arms 60 bolted thereon that can be connected to the chassis 11 in a parallel linkage arrangement so that the row unit 24 can be carried by the chassis 11 in the direction of travel 46. In this sense, the unit body 44 acts as a row unit chassis to keep the various components of the row unit 24 together during operation.

The metering device 48 carried by the unit body 44 is configured to receive seed from a unit storage tank 62 (also known as a mini-hopper) that is carried by the unit body 44 and can connect to one or more of the main storage tanks 18, 20 or 22. For ease of illustration, the electrical and pneumatic lines that would normally be connected to the metering device 48 have been omitted. The metering device 48 can be configured as any type of device which is capable of controllably metering out seeds to be planted by the row unit 24 during operation of the planter 10. For example, the metering device 48 can utilize a metering wheel (not shown) in combination with a vacuum formed in the metering device 48 to selectively pull seeds into a seed drop (not shown), where the vacuum is released and gravity causes the seed to drop into soil below. Other types of metering devices are known and could readily be adopted into the row unit 24 of the present invention.

The furrowing disc 50 carried by the unit body 44 presses into the soil and rotates as the planter 10 travels along a field, displacing soil in the field to form a trench. The furrowing disc 50 can have any type of construction that allows for it to rotate as it is carried along the field to form a trench in the soil, such as the annular disc shape shown. While only one furrowing disc 50 is shown, it is contemplated that two furrowing discs can be included in the row unit 24. Many different types of furrowing disc constructions are known and could be included in the row unit 24. Optionally, the furrowing disc(s) 50 can be connected to the unit body 44 by a furrowing suspension assembly 64 including one or more adjustable gauge wheels 65 that are configured to adjust the depth of the trenches formed by the furrowing disc(s) 50 as the planter 10 travels along the field. Any suitable furrowing suspension assembly can be used to connect the furrowing disc(s) 50 to the unit body 44.

The closing discs 54 carried by the unit body 44 are held behind the furrowing disc 50 in the direction of travel 46 and also rotate as the planter 10 travels along the field. The closing discs 54 are configured to be dug into the ground and collapse the trench that is formed by the furrowing disc 50, by replacing the soil that is dislocated by the furrowing disc 50 or dislocating soil adjacent to the trench into the trench as the closing discs 54 rotate. Any suitable closing discs can be included in the row unit 24. Optionally, the closing discs 54 can have a closing suspension assembly 66 connecting the closing discs 54 to the mounting body 52 that assists in keeping the closing discs 54 at a uniform level within the soil as the planter 10 travels across the field. Any suitable closing suspension assembly can be used to connect closing discs 54 to the mounting body 52. While the row unit 24 is shown as including a pair of closing discs 54, it is contemplated that only one closing disc could be used. Further, the closing discs 54 do not need to be connected to the mounting body 52, but can also be connected to the unit body 44 so that the closing discs 54 are carried in the direction of travel 46 as the planter 10 and row unit 24 travel along the field.

The mounting body 52, as shown, can be bolted to the unit body 44 so that it can carry the connected closing discs 54 and pressing wheel 58 with the unit body 44 as the planter 10 travels across the field. While shown as being a separable piece from the unit body 44, the mounting body 52 can also be an integral part of the unit body 44, if desired. The mounting body 52 can be hollow so that all or a portion of the closing suspension assembly 66 is covered by the mounting body 52. The profile and mounting angle of the mounting body 52 can be adjusted to cover adjacent assemblies or parts, as desired, and to allow a width W of the row unit 24 to be adjusted, which will be described further herein. As used herein, the width W of the row unit 24 refers to the distance between a front of the row unit 24 adjacent to the tool bar 14 and a back of the row unit 24 farthest away from the tool bar 14. While this dimension may also be referred to as a "length" of the row unit 24, in the context of a folded planter this dimension can correspond to the width when the rear end of the pressing wheel 58 is the widest point of the planter 10 when folded. The mounting body 52 can include one or more pivot features 68, shown as circular pegs (only one of which can be seen) formed in the mounting body 52, that define an axis of rotation A1, which will be described further herein. Although the pivot features 68 are shown as circular pegs formed on two side plates 70 of the mounting body 52, the pivot feature 68 can be any structural element or feature connected to or formed in the mounting body 52 that allows a connected element to be pivoted about the axis of rotation A1 defined by the pivot feature(s) 68. For example, the pivot feature 68 can alternatively be an opening formed in the mounting body 52 that allows for an element with a round peg to be pivotally connected by inserting the peg into the opening. Optionally, the mounting body 52 can have a second restraining member 72, shown as a restraining tab, formed in or connected to the mounting body 72, the significance of which will be discussed further herein.

Figure 4:
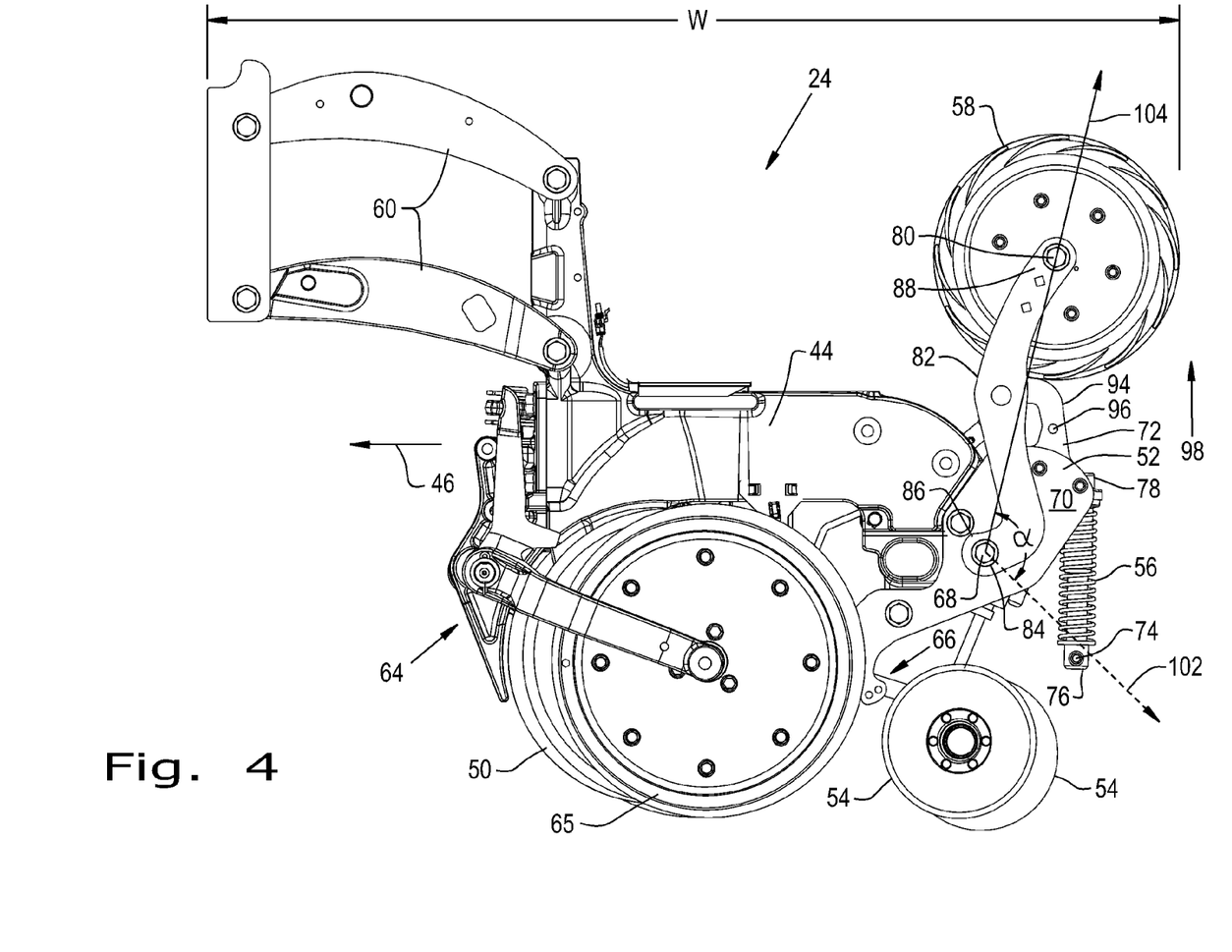
FIG. 4 is a side view of the row unit shown in FIG. 2 with the pressing wheel in a freely pivoting configuration and a second orientation.

The restraining member 56, shown as a spring assembly, is carried by the unit body 44 and reversibly connectable to the pressing wheel 58. The restraining member 56 can be connected to the mounting body 52, as shown, or otherwise associated with the mounting body 52 so that the restraining member 56 is carried by the unit body 44 during operation of the planter 10. The restraining member 56, when connected to the pressing wheel 58, can exert a downward force on the pressing wheel 58 to bias the pressing wheel 58 toward the ground as the planter 10 travels across a field and limit the movement of the pressing wheel 58. In such a configuration, the restraining member 56 can also be referred to as a biasing element, but it should be appreciated that the restraining member 56 does not necessarily need to bias the pressing wheel 58 toward the ground. As it is difficult and sometimes undesirable to keep the pressing wheel 58 completely static when connected to the restraining member 56, the restraining member 56 can allow for limited jounce of the pressing wheel 58 as the planter 10 travels across the field. While shown as a spring assembly, the restraining member 56 can have other configurations that keep the pressing wheel 58 directed toward or in contact with the ground or limit the jounce of the pressing wheel 58 during operation, such as an actuated cylinder. The restraining member 56 can be disconnected from the pressing wheel 58 in a variety of ways which will be described further herein, and has accompanying features that allow for reversible disconnection. As shown in FIG. 4, the restraining member 56 has one or more restraining openings 74 formed in an end 76 opposite an end 78 connected to the mounting body 52 which can receive bolts or other connectors.

The pressing wheel 58, as shown, is a circular wheel that is pivotally connected to the pivot feature 68 and positionable behind the closing discs 54 when connected to the restraining member 56. It should be appreciated that while the pressing wheel 58 is shown as being pivotally connected to the pivot feature 68 of the mounting body 52, the pressing wheel 58 can be carried by the unit body 44 in any manner that allows the pressing wheel 58 to pivotally move relative to the unit body 44 about an axis of rotation. The pressing wheel 58 can have an axle 80 connected to two pivoting arms 82 each having an opening 84 formed therein that slides over the pivot feature 68 to allow the pressing wheel 58 to connect to the pivot feature 68 and pivot about the axis of rotation A1 defined by the pivot feature 68. It should be appreciated that the pivoting arms 82 can each include a structural feature different than an opening 84 to pivotally connect to the pivot feature 68, such as a round peg when the pivot feature 68 is formed as an opening in the mounting body 52. The pivoting arms 82 can each have a curved shape with a first portion 86 where the opening 84 is formed and defined by a first curvature and a second portion 88 that connects to the axle 80 and is defined by a second curvature that is larger than the first curvature and extends oppositely to the first curvature. In addition to being connected to one another by the axle 80, the pivoting arms 82 can be joined together by a connector 90 that extends between the pivoting arms 82. As shown, the connector 90 is a rod connected to both of the pivoting arms 82, but can have other shapes if desired. The rod 90 has a connecting portion 92 that can include one or more connecting arms 94 each having a connecting opening 96 (shown in FIG. 3). The connecting portion 92 is placed on the connector 90 so that the connecting opening(s) 96 can be aligned with the restraining opening(s) 74 of the restraining member 56. Once the connecting opening(s) 96 and restraining opening(s) 74 are aligned, a bolt, pin, or other element can be placed through the aligned openings 74, 96 to connect the pressing wheel 58 to the restraining member 56, which is herein referred to as a restrained pivoting position of the pressing wheel 58. The element placed in the aligned openings 74, 96 to connect the pressing wheel 58 to the restraining member 56 can be a pull pin or other element that allows for tool-less locking and removal, allowing for the pressing wheel 58 to be connected to or disconnected from the restraining member 56 without using special tools.

When the pressing wheel 58 is connected to the restraining member 56, the pressing wheel 58 assumes a constrained pivoting configuration. Since the pressing wheel 58 is pivotally connected to the pivot feature 68, the pressing wheel 58 will tend to pivot about the axis of rotation A1 defined by the pivot feature 68 when a force is applied to the pressing wheel 58 in an upward direction, designated by arrow 98, and the pressing wheel 58 is unrestrained, which is referred to herein as the freely pivoting configuration and is shown in FIG. 4. In the constrained pivoting configuration, the pressing wheel 58 resists pivoting about the axis of rotation A1 defined by the pivot feature 68 due to the connection to the restraining member 56 and, if the restraining member 56 is configured as a biasing member, by a supplied downward force that opposes forces applied to the pressing wheel 58 in the upward direction 98. However, as previously described, it is difficult, if not impossible, to completely eliminate pivoting of the pressing wheel 58 during operation, as irregularities in the field can cause jolting forces through the pressing wheel 58 which slightly and temporarily overcome the restraining force provided by the restraining member 56 and pivot the pressing wheel 58. Therefore, it should be appreciated that the pressing wheel 58 can, and most likely will, still pivot about the axis of rotation A1 in the constrained pivoting configuration, but the force(s) that acts to pivot the pressing wheel 58 about the axis of rotation A1 is at least partially counteracted by restraining forces provided by the connection between the pressing wheel 58 and the restraining member 56. In the same sense, the pressing wheel 58 can also assume a restrained pivoting configuration when connected to the restraining tab 72.

Referring specifically now to FIG. 3, a packing assembly 53 shown in FIG. 2 as connected to the unit body 44 is shown as a separate assembly. The packing assembly 53 can include the mounting body 52 including the pivot feature 68, the closing discs 54 connected to the mounting body 52 by the closing suspension assembly 66, the restraining member 56 connected to the mounting body 52, and the pressing wheel 58 pivotally connected to the pivot feature 68 and removably connectable to the restraining member 56. The axis of rotation A1 shown in FIG. 2 is omitted for ease of illustration, but is defined by the pivot feature 68. As can be seen, the packing assembly 53 can be a part of the row unit 24, as shown in FIGS. 2 and 4, or a separable assembly as shown in FIG. 3. It should therefore be appreciated that the agricultural planter 10 can include the packing assembly 53 as an original component of the row unit 24 or the packing assembly 53 can be retrofitted to the row unit 24 by mounting the packing assembly 53 to the unit body 44.

Referring now to FIG. 4, the row unit 24 is shown with the pressing wheel 58 in the freely pivoting configuration after being pivoted in the upward direction 98, relative to the pivot feature 68, about the axis of rotation A1. The metering device 48 and unit storage tank 62 have been omitted from FIG. 4 for ease of illustration. As can be seen, the pressing wheel 58 is lifted off the ground and the width W of the row unit 24 has been reduced due to the pivoting of the pressing wheel 58. Whereas the pressing wheel 58 was oriented so that it was able to be connected to the restraining member 56 by the connecting portion 92 in the configuration shown in FIGS. 1-3, the configuration of the pressing wheel 58 shown in FIG. 4 is oriented so that the connecting opening(s) 96 of the connecting portion 92 are aligned with one or more openings 100 formed in the restraining tab 72. When the openings 96, 100 are aligned, a connector (not shown) can be placed through the aligned openings 96, 100 to connect the pressing wheel 58 to the restraining tab 72 and place the pressing wheel 58 in a second constrained pivoting configuration. The second constrained pivoting configuration allows for the pressing wheel 58 to be held in a second orientation, relative to the pivot feature 68, that reduces the width W of the row unit 24 and prevents the pressing wheel 58 from pivoting back to a first orientation, also relative to the pivot feature 68, where the width W of the row unit 24 is maximized, which can correspond to when the connecting openings 96 of the connection portion 92 are aligned with the restraining openings 74 of the restraining member 56.

Due to the profile and orientation of the row unit 24, the pressing wheel 58 can pivot a substantial distance between the first orientation (shown in FIGS. 1-3) and the second orientation (shown in FIG. 4). To illustrate the amount of pivoting that can occur, a line 102 is drawn through the pivot feature 68 and axle 80 of the pressing wheel 58 in the first orientation shown in FIG. 2 and superimposed in FIG. 4 as a dashed line 102. A second line 104 is drawn in FIG. 4 through the pivot feature 68 and axle 80 of the pressing wheel 58 in the second orientation, with a degree of freedom angle $\alpha$ being formed between lines 102 and 104 in FIG. 4 that corresponds to the degrees of pivoting that the pressing wheel 58 has done about the axis of rotation A1 between the first orientation and second orientation. As can be seen, the degree of freedom angle $\alpha$ can be greater than 90 degrees so that the pressing wheel 58 is held vertically above the mounting body 52, with the pressing wheel 58 slightly resting on the highest point of the restraining tab 72. It should be appreciated that the degree of freedom angle $\alpha$ shown in FIG. 4 illustrates only the pivoting that the pressing wheel 58 has done between the illustrated first orientation and second orientation and that the pressing wheel 58 can be pivoted a greater or lower number of degrees relative to the pivot feature 68 to reduce the width W of the row unit 24.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural planting apparatus, comprising:
   a chassis;
   a row unit carried by said chassis and defining a width, said row unit including:
   a unit body carried by said chassis;
   a metering device carried by said unit body;
   at least one furrowing disc carried by said unit body;
   at least one closing disc carried by said unit body and positioned behind said at least one furrowing disc in a direction of travel;
   a restraining member carried by said unit body;
   a pressing wheel carried by said unit body, pivotally movable about an axis of rotation relative to said unit body, positionable behind said at least one closing disc in the direction of travel, and reversibly connectable to said restraining member, said pressing wheel having a constrained pivoting configuration when connected to said restraining member and a freely pivoting configuration when disconnected from said restraining member, said pressing wheel resisting pivoting in said restrained pivoting configuration and being configured to reduce said width of said row unit when pivoted in an upward direction about said axis of rotation in said freely pivoting configuration;
   a mounting body carried by said unit body and including a pivot feature defining said axis of rotation, said pressing wheel being pivotally connected to said pivot feature;
   at least one pivoting arm pivotally connecting said pressing wheel to said pivot feature of said mounting body;
   wherein said restraining member is a biasing element, said biasing element being reversibly connected to said at least one pivoting arm, said pressing wheel being in said restrained pivoting configuration when said biasing element is connected to said at least one pivoting arm and in said freely pivoting configuration when said biasing member is disconnected from said at least one pivoting arm; and
   a restraining tab connected to said mounting body, said restraining tab being reversibly connectable to said at least one pivoting arm, said pressing wheel being in said restrained pivoting configuration when said restraining tab is connected to said at least one pivoting arm and in said freely pivoting configuration when said at least one pivoting arm is disconnected from said biasing member and said restraining tab.

2. The planting apparatus according to claim 1, further comprising a second restraining member connected to said mounting body and reversibly connectable to said pressing wheel, said second restraining member holding said pressing wheel in a second constrained pivoting configuration when connected to said pressing wheel.

3. The planting apparatus according to claim 2, wherein said pressing wheel is in said freely pivoting configuration when disconnected from said restraining member and said second restraining member.

4. The planting apparatus according to claim 2, wherein said pressing wheel is reversibly connectable to said restraining member in a first orientation relative to said unit body and reversibly connectable to said second restraining member in a second orientation relative to said unit body, said pressing wheel pivoting at least 90 degrees about said axis of rotation between said first orientation and said second orientation.

5. The planting apparatus according to claim 1, wherein said biasing member connects to said at least one pivoting arm in a first orientation relative to said pivot feature and said restraining tab connects to said at least one pivoting arm in a second orientation relative to said pivot feature, said pressing wheel pivoting at least 90 degrees about said axis of rotation between said first orientation and said second orientation.

6. The planting apparatus according to claim 1, wherein said row unit includes a pair of pivoting arms connected to said pressing wheel and joined together by a connector, said pair of pivoting arms both being pivotally connected to said mounting member and said connector being reversibly connectable to said restraining member.

7. The planting apparatus according to claim 6, wherein said restraining member includes a restraining opening and said connector includes a connecting portion with a connecting opening, said connecting portion being reversibly connectable to said restraining member when said connecting opening aligns with said restraining opening.

8. A packing assembly for a row unit of an agricultural planting apparatus defining a width, comprising:
   a mounting body including a pivot feature defining an axis of rotation;
   at least one closing disc connected to said mounting body;
   a restraining member connected to said mounting body;
   a pressing wheel pivotally connected to said pivot feature and being reversibly connectable to said restraining member, said pressing wheel having a constrained pivoting configuration when connected to said restraining member and a freely pivoting configuration when disconnected from said restraining member, said pressing wheel resisting pivoting in said restrained pivoting configuration and being configured to reduce said width of said packing assembly when pivoted in an upward direction about said axis of rotation in said freely pivoting configuration
   at least one pivoting arm pivotally connecting said pressing wheel to said pivot feature of said mounting body;
   wherein said restraining member is a biasing element, said biasing element being reversibly connected to said at least one pivoting arm, said pressing wheel being in said restrained pivoting configuration when said biasing element is connected to said at least one pivoting arm and in said freely pivoting configuration when said biasing member is disconnected from said at least one pivoting arm; and
   a restraining tab connected to said mounting body, said restraining tab being reversibly connected to said at least one pivoting arm, said pressing wheel being in said restrained pivoting configuration when said restraining tab is connected to said at least one pivoting arm and in said freely pivoting configuration when said at least one pivoting arm is disconnected from said biasing member and said restraining tab.

9. The packing assembly according to claim 8, further comprising a second restraining member connected to said mounting body and reversibly connectable to said pressing wheel, said second restraining member holding said pressing wheel in a second restrained pivoting configuration when connected to said pressing wheel.

10. The packing assembly according to claim 9, wherein said pressing wheel is in said freely pivoting configuration when disconnected from said restraining member and said second restraining member.

11. The packing assembly according to claim 9, wherein said pressing wheel is reversibly connectable to said restraining member in a first orientation relative to said pivot feature and reversibly connectable to said second restraining member in a second orientation relative to said pivot feature, said pressing wheel pivoting at least 90 degrees about said axis of rotation between said first orientation and said second orientation.

12. The packing assembly according to claim 8, wherein said biasing member connects to said at least one pivoting arm in a first orientation relative to said pivot feature and said restraining tab connects to said at least one pivoting arm in a second orientation relative to said pivot feature, said pressing wheel pivoting at least 90 degrees about said axis of rotation between said first orientation and said second orientation.

* * * * *